Jan. 12, 1943.　　　F. A. VOILES　　　2,307,903
INTERNAL COMBUSTION ENGINE
Filed Aug. 4, 1941　　　8 Sheets-Sheet 2

Fig. 3

Inventor
Frank A. Voiles
By Rummler Rummler & Davis
Attys.

Jan. 12, 1943.  F. A. VOILES  2,307,903
INTERNAL COMBUSTION ENGINE
Filed Aug. 4, 1941  8 Sheets-Sheet 3

Fig. 4

Inventor
Frank A. Voiles
By Rummler Rummler & Davis
Attys.

Jan. 12, 1943.  F. A. VOILES  2,307,903
INTERNAL COMBUSTION ENGINE
Filed Aug. 4, 1941  8 Sheets-Sheet 4

Inventor
Frank A. Voiles
By Rummler Rummler & Davis
Attys.

Jan. 12, 1943.     F. A. VOILES     2,307,903
INTERNAL COMBUSTION ENGINE
Filed Aug. 4, 1941     8 Sheets-Sheet 5

Inventor
Frank A. Voiles
By
Rummler Rummler & Davis
Attys.

Jan. 12, 1943.　　　F. A. VOILES　　　2,307,903
INTERNAL COMBUSTION ENGINE
Filed Aug. 4, 1941　　　8 Sheets-Sheet 7

Jan. 12, 1943.   F. A. VOILES   2,307,903
INTERNAL COMBUSTION ENGINE
Filed Aug. 4, 1941   8 Sheets-Sheet 8

Inventor
Frank A. Voiles
By Rummler Rummler & Davis
Attys.

Patented Jan. 12, 1943

2,307,903

UNITED STATES PATENT OFFICE 2,307,903

INTERNAL COMBUSTION ENGINE

Frank A. Voiles, Chicago, Ill.

Application August 4, 1941, Serial No. 405,356

4 Claims. (Cl. 123—17)

The improvements herein disclosed relate to a type of motor in which the principles of operation and general arrangement of the mechanism are similar to that described in patent to Voiles, No. 2,127,016, dated August 16, 1938. The illustrations accompanying this specification show a motor which has radial cylinders which rotate as a unit around a relatively stationary crank shaft. Thus, the pistons are caused to reciprocate in the cylinders as the cylinders rotate around the crank shaft. The operation though is not as usual in many well-known radial motors in which the compressed charges are fired in the same cylinders.

In this Voiles motor radial cylinders are used exclusively for the purpose of effecting compression of the combustible mixture and an arcuate expansion chamber of relatively large radius is employed exclusively for work delivery in a manner enabling long power strokes to be successively imparted to the driven portion of the machine. Impeller elements associated with the compression cylinders travel relatively to the arcuate expansion chamber and this specification relates particularly to the specific construction and action of the impeller elements which constitute charge-receiving means intermediate the compression cylinders and the expansion chamber, and to improved associated mechanism, as the particular arrangement of check valves, intake manifold and operating means for intake valves, the ignition lay-out, and to other details of construction, all designed primarily for weight reduction with reference to the power delivered by the motor.

The specific relative arrangement of the operating elements of the motor also adds to its practical usefulness in ease of operation, minimizing needless power losses, unnecessary motion and enabling exceptionally rapid dismantling and reassembly of the motor. The particular constructions as specified in the accompanying claims have to do with the overall efficiency of the motor.

The objects of the invention are to increase the efficiency of internal combustion engines; that is, the overall efficiency regarding power delivery with reference to weight and size and increase in efficiency because of the method operating law of the structure and also because of the arrangement and design of individual elements of the machine.

The drawings illustrate all the essential parts of the machine.

The key feature of this machine is the particular construction of the charge-receiving elements, one of which is closely associated with each compression cylinder to receive the compressed charges. The pistons of the cylinders make complete strokes up to the head of the cylinder. The charge-receiving elements oscillate and cut off communication with their respective compression cylinders immediately upon receiving a charge therefrom. At the same instant the charge is ignited and the impeller begins to communicate with a stationary expansion chamber, which chamber is sealed by a vane on the impeller element. The surfaces of the expansion chamber are formed to coincide exactly with the path of movement of the vanes as the impeller turns on its axis and moves bodily in an arcuate path around the center of the machine. As these impeller elements are sealing devices for retaining the charge at the instant of explosion and during the following expansion of the heated gases, the surfaces thereof are formed with the utmost accuracy with reference to the support for these elements and the expansion chamber which the vanes of the impeller elements fit. Also, material employed for these interfitting elements is selected, as is the case with other light gas motors, for minimum change in volume under temperature variations.

There is a check valve between each compression cylinder and charge-receiving element. These check valves are opened, against spring action by the pressure of the combustible mixture flowing from the cylinders to the charge-receiving elements, and are closed as the pressure becomes more uniform on opposite sides of the valve..

Oscillatory movement of the impellers is effected by pitman connections with a stationary cam, and the only other important valve action performed by the machine is accomplished by a cam arrangement for reciprocating intake valves for the compression cylinders. These act to hold the valves open during the 180° rotation of the rotor following delivery of charges from the cylinders to the impeller elements. During the remaining 180° of rotation the intake valves are held closed while the compression stroke takes place.

Thus, the essential principal elements of this motor include an annular series of charge-receiving impeller elements which rotate around a fixed center. Rotating with these impeller elements is a series of radial cylinders which are employed exclusively for effecting compression of the explosive charges before delivery to the impeller elements. Due to this fact, connecting rods for the charge-compressing pistons and the bearings of these connecting rods are not subject to the shock of explosions, and therefore need to be of only sufficient strength and weight to withstand the strains of the compression strokes.

The operating principle of this motor enables it to be designed for a wide range of normal speeds. Power strokes of predetermined lengths at the periphery of the motor may be few or many, depending upon the number of cylinders. Few power strokes in a machine of specified diameter results in less speed than when there are many power strokes taking place for each revolution in a machine of the same diameter. Thus, increasing the diameter of the machine without change in number of cylinders or length of stroke results in a reduction of normal speed. Therefore, if it is so desired, the speed of the machine may be in inverse ratio to its diameter. There is the same relationship between horsepower and weight.

Whatever may be the number of cylinders in this type of motor, each provides the charge for a single power impulse on each revolution of the motor. Thus, if there are seven cylinders, there would be seven power impulses per revolution.

The speed of the motor approximates that required in many commercial uses without the need of speed changing gearing and the excess weight and friction losses incidental therewith.

Figure 1:
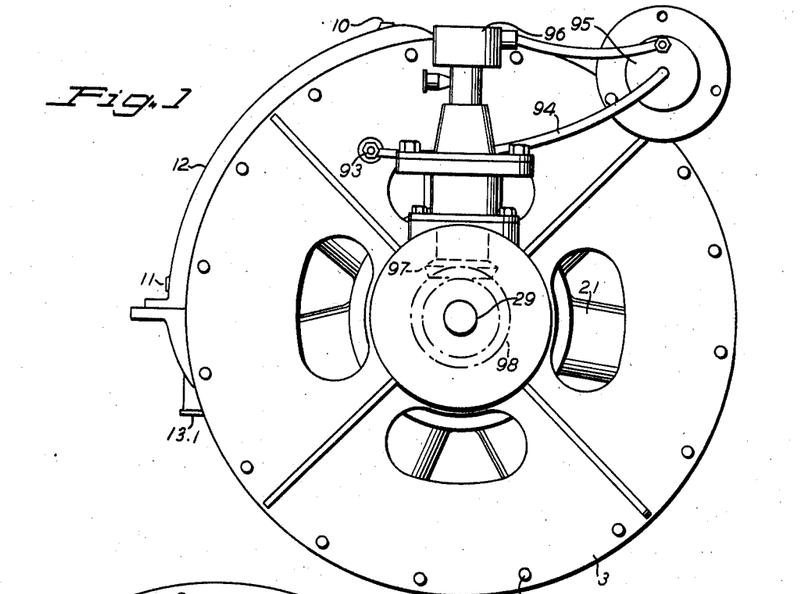
Figure 1 is a face view of the motor showing the propeller shaft coupling side and where a starting device is applied.
Figure 2:
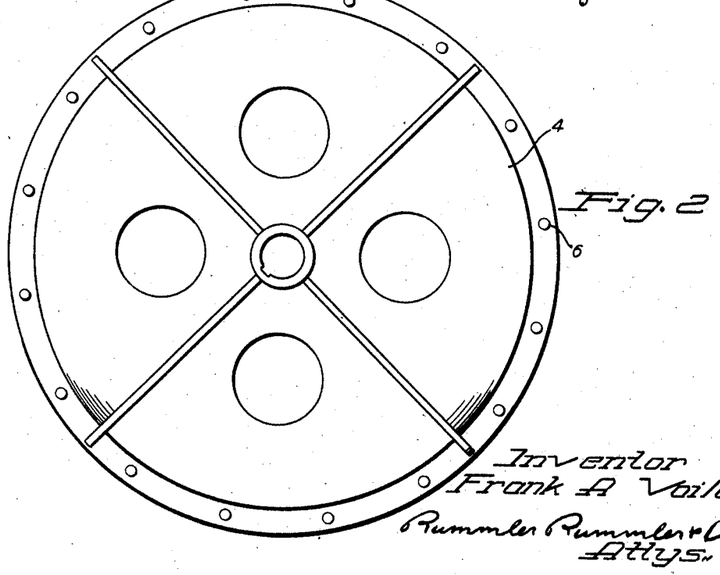
Fig. 2 is a face view of a housing plate which is on the opposite side of the motor.
Figure 3:
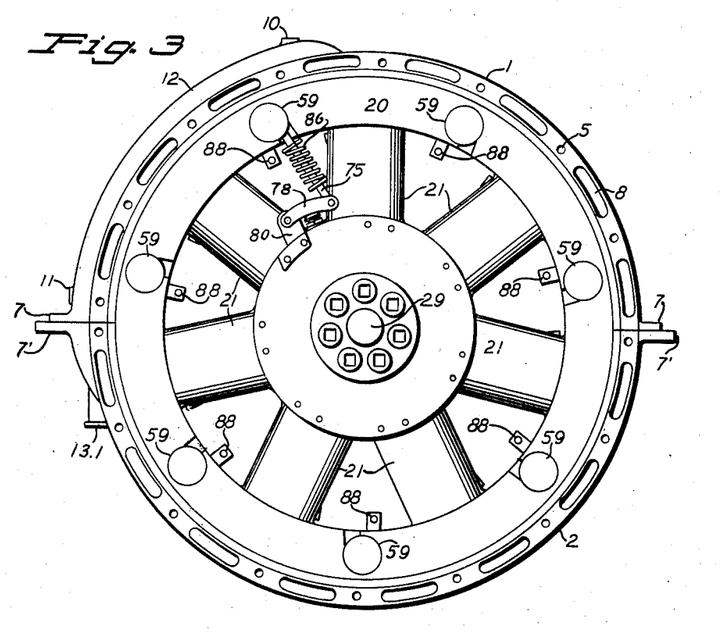
Fig. 3 is a view of the same side of the motor as shown in Fig. 1, but with the end casing plate removed.
Figure 4:
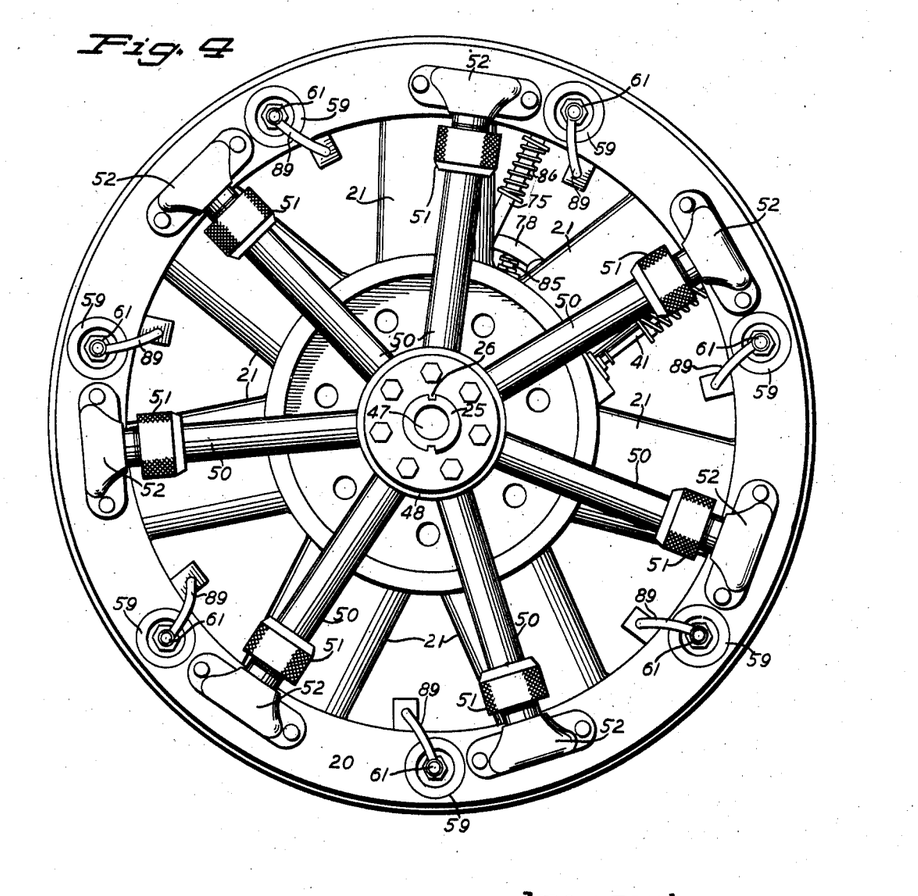
Fig. 4 is an enlarged view of the motor showing the motor as it appears in side elevation opposite to the propeller shaft side, and with the stationary casing therefor removed.

With particular reference to the specific construction illustrated in the drawings, the motor is provided with a stationary casing comprising an outer ring formed of two semi-circular sections 1 and 2, Fig. 3, and two disc-shaped end members 3 and 4, Figs. 1 and 2. The ring formed by the elements 1 and 2 is regularly perforated transversely, as indicated at 5, to receive bolts 6 which serve to clamp the end frame members 3 and 4 to the ring. Sections 1 and 2 are flanged at 7 where these sections are bolted together to form a continuous ring. The larger flanges 7' are used to secure the engine to its bed. The stationary ring is of hollow water-jacket form, as indicated by the transverse passageways 8 which communicate with annular water-circulating channels 9 formed in the end frame members 3. The water intake is indicated at 10 and outlet at 11, Fig. 1. The ring section 1 is enlarged at 12 in a radial direction to accommodate an annular expansion chamber 13, Figs. 7 and 9, having a water jacket passage 15 enclosed by walls 14 and 16.

Figure 10:
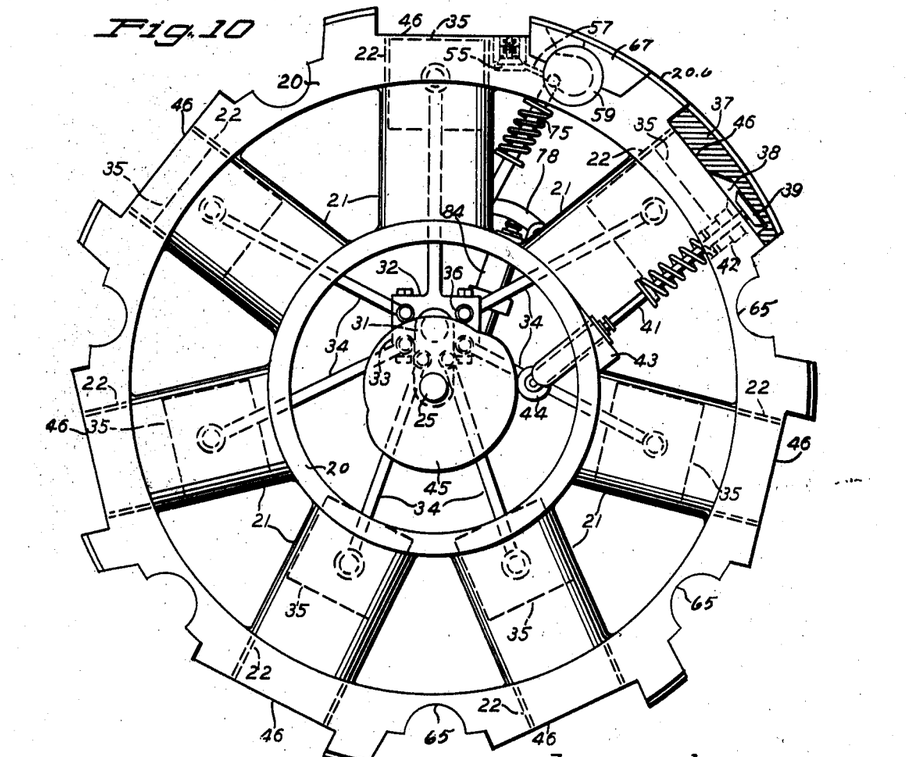
Fig. 10 is a face view, partly in section, of the rotor or cylinder casting for the motor, and includes a showing of the crank shaft, pistons and connecting rods.
Figure 11:
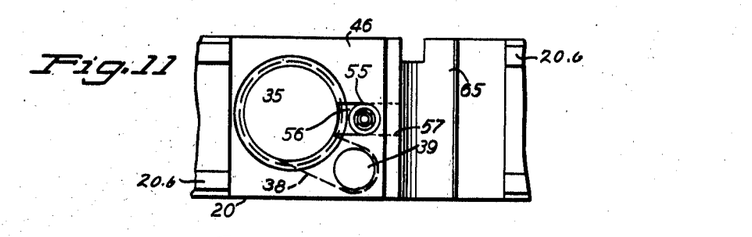
Fig. 11 is a fragmentary plan view of the upper portion of the structure shown by Fig. 10.

The rotor unit of the engine fits within the above described stationary casing and comprises a cylindrical block 20 made up of an outer head ring 20.1, an inner head ring 20.2 and a series of radial cylinders 21 extending between the rings 20.1 and 20.2. The rotor frame also includes an end wall or disc 20.3 having a hub 20.4. The opposite end of the head ring 20.2 is fitted with a disc 20.5 to complete the enclosure of the crank chamber. The outer periphery of the rotor is provided with annular peripheral ribs 20.6 which fit and are seated within corresponding annular grooves in the stator ring formed by the frame members 1 and 2. All parts so far mentioned are preferably aluminum alloy castings, but the cylinders are internally surfaced with steel sleeves 22 (see Fig. 10). The disc end frame member 3 carries bearings 23 and 24 for the rotating cylinder block.

Figure 9:
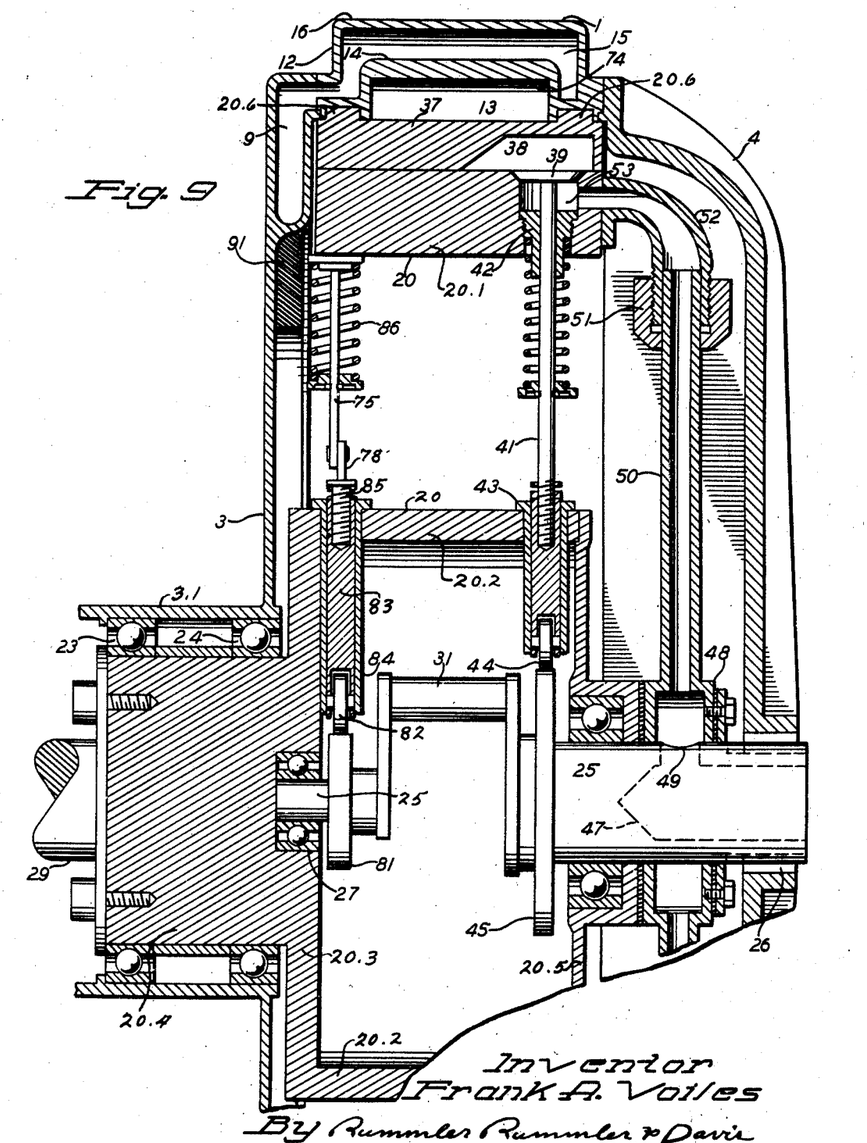
Fig. 9 is a fragmentary enlarged detail view of the motor with parts in section, on arbitrarily selected lines roughly radial with respect to the main shaft.

A non-rotating crank shaft 25 is keyed at one end to frame member 4, as indicated at 26, Fig. 9, and at its other end fits a socket 27 in rotor member 20.3.

A power transmission shaft 29 (Fig. 9) is secured to the hub 20.4 of the cylinder block. This drive shaft is made to clutch couple with a propeller shaft or constitutes a propeller shaft, and serves to receive motion from starting means, not shown.

The wrist 31 of the crank shaft 25 is surrounded by a master pitman 32 and its cap 33. The remaining pitmans or connecting rods 34 for the pistons 35 are pivotally connected at 36 to the master pitman and its cap.

The wrist 31 of the crank shaft remains stationary and is eccentric to the cylinder block 20. Rotation of the latter causes all of the pistons and their connecting rods to rotate around the center provided by wrist 31 and effects reciprocation of the pistons in the cylinders through strokes which correspond in length to twice the eccentricity of the wrist 31 with reference to the bearings for the crank shaft. The strokes of the pistons are practically complete up to the cylinder heads 37, Fig. 10. The cylinder heads 37 are bolted to the cylinder block and each has a channel 38 formed on its inner face to afford an intake passageway between an intake valve 39 and its respective cylinder.

Intake valves 39 have stems 41 slidably fitting bearings 42 and 43 formed in the cylinder block. The inner ends of the valve stems 41 carry rollers 44 bearing upon a cam 45, in fixed relation to the rotating cylinder block. The valves are perpendicular to the surfaces 46 fitting the cylinder heads but do not extend radial to the bearing center of crank shaft 25 in order to receive a more direct thrust upon opening movement under the action of cam 45.

No charge forming device is illustrated in the drawings, but the engine receives a mixture as usual from carburetors or jets through the hollow end 47 of the fixed crank shaft upon which the charge forming device is mounted. The hollow end of the crank shaft is surrounded by a hollow annular intake manifold 48 with which the hollow end of the crank shaft communicates through the port 49. The intake manifold includes a series of radial tubular conduits 50, one for each cylinder which at their outer ends, have screw threaded attachments 51 to hollow elbows 52 bolted to the cylinder block.

The cylinder block has intake passageways 53 which provide communication between the elbows 52 and passageways 38 formed in the cylinder heads 37. Under the control of intake valves 39, the passageways 38 lead to the upper ends of the cylinders.

The intake valves are held open for approximately 180° of rotation of the cylinder block during the intake stroke of the pistons. Compression takes place during the remaining 180° rotation and as the compression increases sufficiently a spring-closed check valve 55 opens so that near the end of the stroke the compressed charge forces its way from a cylinder through a passageway of the check valve. The passageway 56 leads through the portion 57 thereof, Fig. 7, to a port 58 formed across the face of each impeller 59. When a piston has reached the end of its stroke, the pressures on opposite sides of the check valve are equalized sufficiently to allow the spring for check valve 55 to close the valve.

Figures 7, 8:
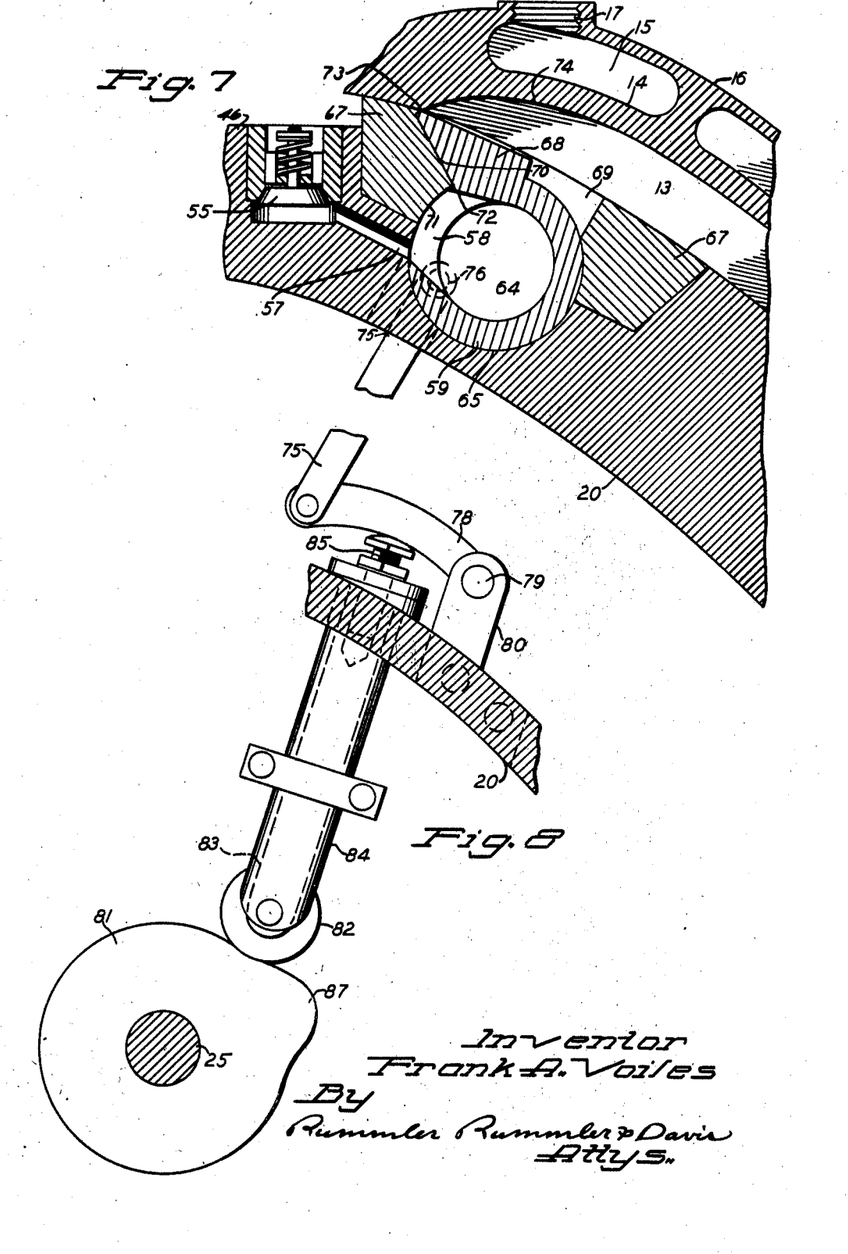
Fig. 7 is an enlarged sectional view of the impeller element and surrounding structure, taken at the location indicated by the line 7—7 on Fig. 5.
Fig. 8 forms a fragmentary continuation of Fig. 7 to illustrate operating means for oscillating the impeller.

The impeller elements are hollow cylindrical structures closed at both ends. The closure at one end is effected by an insert 60 formed to constitute a spark plug well and for receiving the spark plug 61 at the screw thread 62. The points 63 (Fig. 5) of the spark plug are exposed to the hollow chamber 64 formed in each impeller cylinder for the purpose of igniting the compressed charges received by the impellers. Ignition takes place when the check valves are seated and it is, therefore, not possible for this engine to backfire. At the time of firing, passageway 57, Fig. 7, is cut off due to rotation of an impeller cylinder 59. A solid part of the impeller cylinder blocks communication between passageway 57 and port 58 of the impeller cylinder as this port comes into communication with expansion chamber 13. Each impeller cylinder is seated for rotation on its axis in a bearing 65 formed in the cylinder block and is held in its bearing by a cap 67 bolted to the block.

Figure 5:
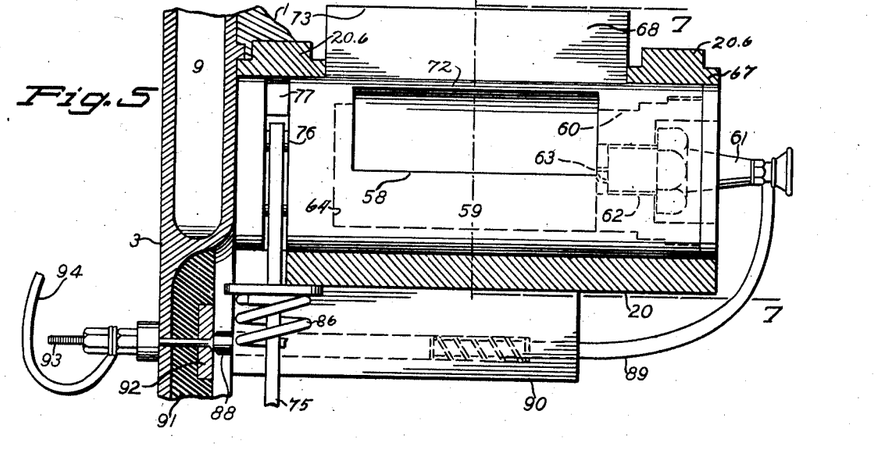
Fig. 5 is an enlarged fragmentary detail of a portion of the motor to show the specific construction of the principal feature of this invention; namely, an impeller element having a firing chamber for compressed charges, some of the adjacent parts of the housing structure being shown in section.

Each impeller cylinder has a projecting vane 68 at one side of port 58 and this vane extends through an opening 69 in the cap 67, which opening is so formed as to permit the vane 68 to swing on the axis of the body 59 of the impeller to a position where it stands approximately radial to the axis of the rotor 20 as this vane traverses the passage 13. The seat 70 on cap 67 for contact with vane 68 is supplemented for sealing purposes by the curved surface 71 where it engages a sealing lip 72 at the inner side of the vane. The outline of port 58, Fig. 5, is such that this port is completely surrounded by the outer cylindrical surface of the impeller, and this cylindrical surface forms a perfect fit with the cylindrical seat or bearing therefor as provided by the engine block and the cap 67.

Each impeller element is oscillated in its bearing in timed relation with the rotation of the cylinder block, so that each impeller opens to the expansion chamber 13 at the instant required to cause the tip 73 of the vane to follow the curved surface 74 of the expansion chamber.

The means for operating each impeller consists of an individual link 75 which, at its outer end, has a pivot connection 76 with its respective impeller. To receive the link each impeller is slotted at 77 near the left-hand end, Fig. 5. The slot is formed to provide clearance between the pitman and the impeller during the oscillatory movement imparted to the impeller. The link 75 is connected at its lower end to an arm 78, Fig. 8, which is pivoted at 79 to a bracket arm 80 attached to the engine block. The stationary cam 81 is engaged by the follower roller 82 carried by a slide 83. This slide moves outwardly in a sleeve bearing 84 attached to the rotary engine block, and at its upper end carries screw 85 having a rounded head engaging the arm 78. Arm 78 is held in contact with the head of screw 85 by a restoring spring 86, Fig. 9, operating in opposition to the high point 87 of cam 81.

Figure 6:
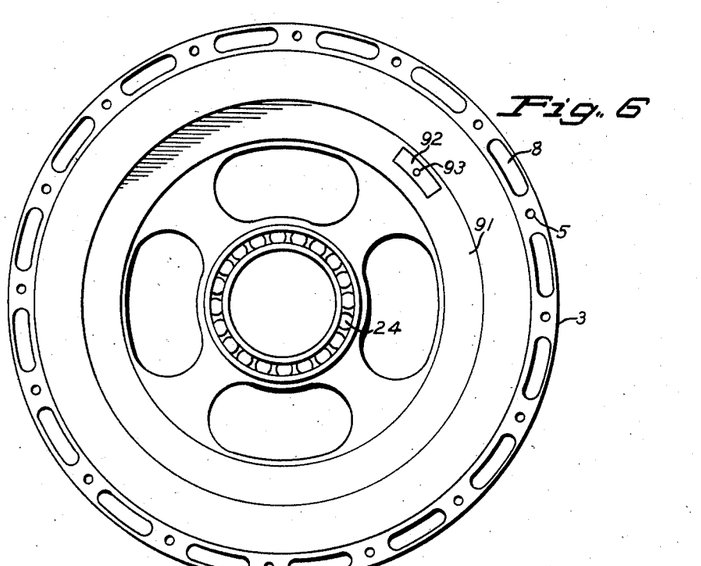
Figure 6 is an inside view in elevation of the end stationary casing plate, the outer face of which is shown in Fig. 1.

To successively effect sparking at the plugs 61, the engine block carries a series of resilient contact plungers 88 which are individually connected with their respective spark plugs by cables 89 passing through insulating blocks 90 secured to the rotor or cylinder block 20. The contact plungers 88 bear against the fixed annular insulating ring 91 carried by frame member 3, Fig. 6. Inserted in this insulating ring 91 is a flush metallic distributing block 92 which is successively contacted by the plungers 88. A binding post 93 is anchored to contactor 92 and connects by cable 94, Fig. 1, to an induction coil 95 which is suitably connected to a source of current and to breaker points located at 96 and operated in the usual way by a cam driven by gear 97 through gear 98 carried by the drive shaft 29.

While the drawings show all the essential operating mechanism of the engine and include a detailed showing in one or more places of the construction of valves for one impeller and one compression cylinder it will be understood that the operating mechanisms shown in detail, particularly in Figs. 5, 7, 8 and 9, are required for each cylinder, but in order to simplify the drawings, the repetitious illustration of these features has been omitted from the more general views.

Figures 12, 13:
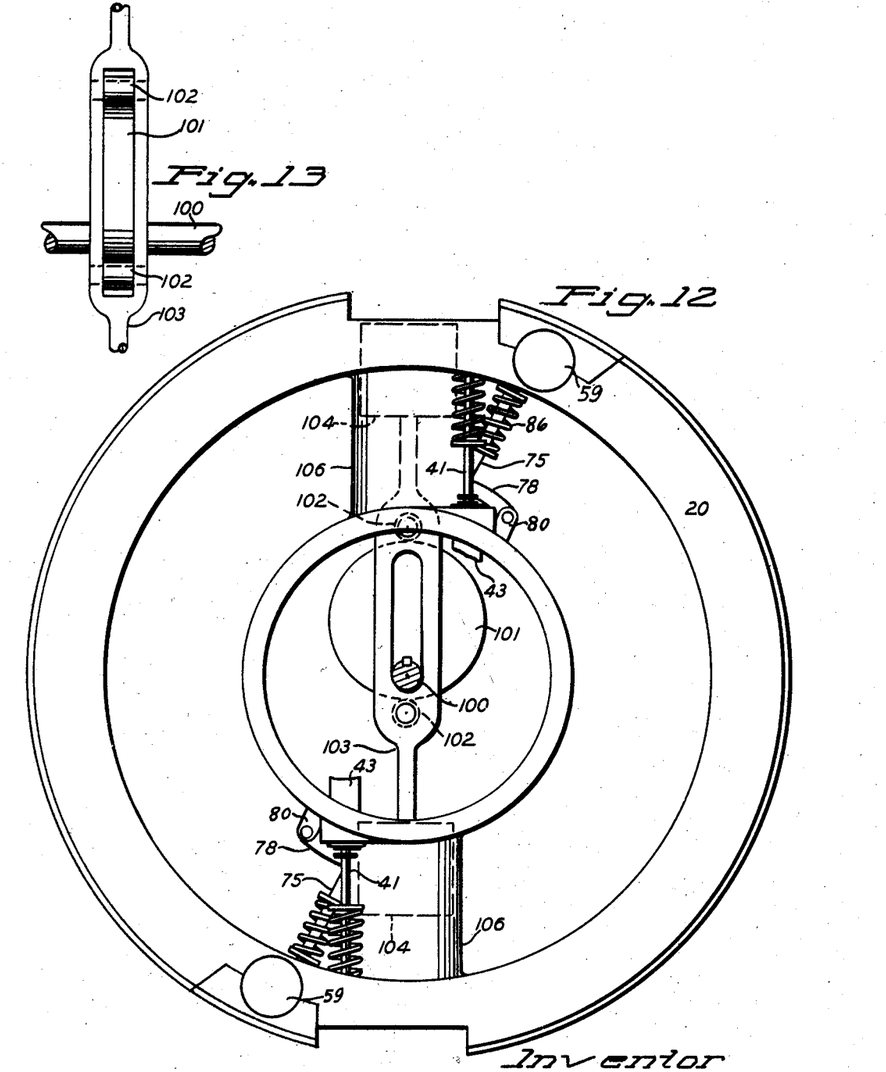
Fig. 12 is a view of the engine in elevation with the casing removed, showing a two-cylinder arrangement thereof with a variation from the remaining drawings in the modified pitman mechanism employed for reciprocating the pistons in the cylinders.
Fig. 13 is a fragmentary view in side elevation of the pitman operating means shown in Fig. 12.

The two-cylinder motor shown in Fig. 12 employs the same construction of impeller elements, valves, ignition and intake arrangement illustrated by the remaining figures, but it does not make use of a crank shaft and the customary connecting rod arrangement of radial motors. Instead, it employs a straight central shaft in fixed relation with the engine casing. This shaft, which is concentric to the rotor and casing is indicated in Fig. 12 by the numeral 100. It carries an eccentric disc 101 for engaging rollers 102 on a pitman 103. The pitman slides in bearings 105 on the rotor and at its outer end the pitman connects to pistons 104. The cylinders are indicated at 106.

In the operation of the engine it is started by rotating the cylinder block within the fixed casing. This results in putting the machine through an initial cycle of operation until firing is effected of compressed charges in the impellers and the engine continues to run after the starting device becomes disconnected, as usual. The intake strokes of the pistons overlap throughout each 360° rotation of the cylinder block, but each is completed by 180° rotation. The same is true regarding compression strokes. Intake valves are successively held open and closed as required for the intake and compression strokes. Towards the end of each compression stroke the corresponding compressed charge is received by its respective impeller. The pistons travel complete strokes to the outer ends of the cylinders, and return of the compressed charge to a cylinder is prevented by the check valves. A small residual part of the charge remaining in advance of the check valve mixes with the succeeding charge received on the next intake stroke. As soon as the firing chamber of an impeller is fully charged, ignition takes place and the impeller is oscillated by mechanical means so that its port communicates with the arcuate expansion chamber in the fixed casing of the machine.

The vane of each impeller follows and seals the curved surfaces of the expansion chamber numeral 13. The end wall 74 of the expansion chamber serves as a fixed abutment for the expanding gases which deliver their power to the moving impellers. The power stroke may be much longer than the compression stroke, and the arrangement is convenient for favorable leverage between the source of power and the application of compression. The outlet port 13.1 of the expansion chamber is open to the atmosphere or to exhaust gas conduits, and since before release the gases may have expanded to a low pressure, the resultant sound is considerably reduced over that occurring in cases where the exhaust gases are released at high pressure.

The degree of compression of the explosive charge in the cylinders is made to exceed slightly the compression desired at the instant of explosion for the purpose of compensating for a preliminary small degree of expansion of the charge as the vane of an impeller moves into the expansion chamber for receiving a power stroke. The power of the exploding gases becomes effective for work just as soon as the impeller vane arrives in a position beyond the circumference of the rotor. That is, the impeller vane sets at an effective angle to the rotor far ahead of its arriving near a radial position.

The operation of the construction shown by Fig. 12 is substantially the same as the principal construction illustrated by the remaining views, although the means employed for effecting reciprocation of the pistons in the cylinder makes use of a different mechanical arrangement.

In a motor of this type friction is minimized to a considerable degree for the reason that the compression cylinders are not subject to the two extra strokes, as is usually required for transmitting power and clearing the cylinders of burned gases. These cylnders remain clean for compression purposes exclusively, and are not subject to the wear by side thrust of pistons on power strokes. In the two-cylinder motor illustrated by Fig. 12, side thrust on the pistons is almost totally eliminated, even on the intake and compression strokes, for the pistons have straight line connections with the means for effecting reciprocation of the pistons.

I claim:

1. A gas engine including a fixed housing having an arcuate expansion chamber formed therein, a cylinder block rotatably mounted within said housing and carrying a compression cylinder, a central shaft in fixed relation with the housing and around which the cylinder block rotates, a piston fitting said compression cylinder, an operating means for said piston consisting of a fixed cam member on the central shaft, means for reciprocating the piston operated by said cam when the cylinder block rotates around the shaft, an impeller unit carried by the cylinder block and consisting of a hollow cylindrical body formed with a port and a projecting vane adjacent the port, said vane being made to fit the expansion chamber in the housing, and ignition means carried by the impeller unit.

2. In an internal combustion engine, rotor and stator members, one of said members comprising an annular block, the other said member having an arcuate expansion chamber one side of which is formed by said block, a hollow cylindrical impeller unit mounted to turn in said block and having a radially disposed vane shaped to extend across and fit said arcuate expansion chamber, a cap set into said block and coacting therewith to provide a divided cylindrical bearing for said impeller unit and having an opening through which said vane extends shaped to house said vane in a retracted position and to permit said vane to swing to its extended position, said impeller unit being ported to communicate alternately with said supply means and said arcuate chamber through the oscillation thereof with said vane, and means actuated by the relative rotation of said members for oscillating said impeller unit, supplying compressed gas to said impeller unit and igniting same.

3. In an internal combustion engine, a rotor member and a stator member mounted one within the other, the outer said member comprising a casing ring surrounding the periphery of the inner said member and having an arcuate channel therein opposed to the inner member and coacting therewith to form an expansion chamber, the inner said member comprising radially disposed fuel compressing cylinders, a head ring connectng said cylinders, heads for said cylinders seated in said head ring, a transversely disposed cylindrical impeller unit adjacent each compression cylinder and seated in said head ring, caps extending over said impeller members to hold same on their seats, an impeller vane mounted on each impeller unit and shaped to extend across and fit said expansion chamber, said caps having openings therein through which said vane extends and shaped to house said vane in a retracted position and to permit said vane to swing to its extended position, a fuel passage connecting each said cylinder and its impeller unit, and said impeller units being ported to communicate alternately with said fuel passage and expansion chamber through the oscillation of the impeller unit.

4. In an internal combustion engine, a rotor member and a stator member mounted one within the other, the outer said member comprising a casing ring surrounding the periphery of the inner said member and having an arcuate channel therein opposed to the inner member and coacting therewith to form an expansion chamber, the inner said member comprising radially disposed fuel compressing cylinders, a head ring connecting said cylinders, heads for said cylinders seated in said head ring, a transversely disposed cylindrical impeller unit adjacent each compression cylinder and seated in said head ring, caps extending over said impeller members to hold same on their seats, an impeller vane mounted on each impeller unit and shaped to extend across and fit said expansion chamber, said caps having openings therein through which said vanes extend and shaped to house said vane in a retracted position and to permit said vane to swing to its extended position, a fuel passage connecting each said cylinder and its impeller unit, said impeller units being ported to communicate alternately with said fuel passage and expansion chamber through the oscillation of the impeller unit, each said cylinder head, impeller unit cap and the intermediate portions of said head ring being shaped to cooperate to form a continuous closure wall for said arcuate expansion chamber.

FRANK A. VOILES.